(12) United States Patent
Bland et al.

(10) Patent No.: US 8,102,651 B2
(45) Date of Patent: Jan. 24, 2012

(54) AIRFLOW BARRIERS FOR EFFICIENT COOLING OF MEMORY MODULES

(75) Inventors: Patrick M. Bland, Raleigh, NC (US); Vinod Kamath, Raleigh, NC (US); Jimmy G. Foster, Sr., Morrisville, NC (US); Ivan R. Zapata, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 12/572,301

(22) Filed: Oct. 2, 2009

(65) Prior Publication Data

US 2011/0080700 A1  Apr. 7, 2011

(51) Int. Cl.
*H05K 7/20* (2006.01)
(52) U.S. Cl. .................. 361/695; 361/694; 454/184
(58) Field of Classification Search ........... 361/694–695
See application file for complete search history.

(56) References Cited

U.S. PATENT DOCUMENTS

| | | | |
|---|---|---|---|
| 4,894,749 A | 1/1990 | Elko et al. | |
| 5,375,038 A | 12/1994 | Hardt | |
| 5,410,448 A * | 4/1995 | Barker et al. | 361/695 |
| 5,428,503 A * | 6/1995 | Matsushima et al. | 361/695 |
| 5,914,858 A | 6/1999 | McKeen et al. | |
| 6,400,568 B1 * | 6/2002 | Kim et al. | 361/697 |
| 6,480,379 B1 | 11/2002 | Dickey et al. | |
| 6,483,699 B1 | 11/2002 | Salmonson et al. | |
| 6,927,976 B1 | 8/2005 | Malone et al. | |
| 7,092,252 B2 * | 8/2006 | Robertson | 361/690 |
| 7,269,006 B2 | 9/2007 | Miyamoto et al. | |
| 7,342,797 B2 * | 3/2008 | Kamath et al. | 361/721 |
| 7,344,439 B2 | 3/2008 | Henry et al. | |
| 7,345,873 B2 | 3/2008 | Dey et al. | |

(Continued)

FOREIGN PATENT DOCUMENTS

JP  2006-216594 A  8/2006

OTHER PUBLICATIONS

IBM "Automatic Self-Deforming Air Baffles to Eliminate Air Flow Bypass Through a DIMM Connector", IPCOM000171719D, http://www.ip.com/pubview/IPCOM000171719D, Jun. 17, 2008, pp. 1-2.

*Primary Examiner* — Gregory Thompson
(74) *Attorney, Agent, or Firm* — Cynthia G. Seal; Jeffrey L. Streets (57) ABSTRACT

Method and apparatus providing airflow through a chassis including an upstream column of memory modules and a downstream column of memory modules. The airflow is divided into first and second separate airflow streams extending from an upstream end of the upstream column to a downstream end of the downstream column. The first airflow stream is guided into contact with a single memory module operably-installed in the upstream column and to avoid contact with any memory module in the downstream column. The second airflow stream is guided to avoid contact with any memory module in the upstream column and into contact with a single memory module operably-installed in the downstream column. The improved cooling enables the extended use of a single memory module per channel, even though the thermal load on such a memory module is greater. The result is an overall savings of power, since cooling requirements no longer dictate the installation of additional memory modules per channel in order to share and distribute the thermal load.

21 Claims, 8 Drawing Sheets

U.S. PATENT DOCUMENTS

| | | |
|---|---|---|
| 7,432,819 B2 | 10/2008 | Kleinecke et al. |
| 7,474,528 B1 | 1/2009 | Olesiewicz et al. |
| 7,542,289 B2 * | 6/2009 | Tsai et al. .................... 361/695 |
| 7,654,840 B1 * | 2/2010 | Zapata et al. ................. 439/196 |
| 8,009,417 B2 * | 8/2011 | Searby et al. ............. 361/679.5 |
| 2006/0039108 A1 | 2/2006 | Chikusa et al. |
| 2007/0008699 A1 | 1/2007 | Strmiska et al. |
| 2007/0121286 A1 | 5/2007 | Foster, Sr. et al. |
| 2007/0129000 A1 | 6/2007 | Rasmussen et al. |
| 2007/0139897 A1 * | 6/2007 | RaghuRam ................... 361/720 |
| 2007/0173189 A1 | 7/2007 | Lewis |
| 2008/0117589 A1 | 5/2008 | Carrera et al. |
| 2009/0016019 A1 * | 1/2009 | Bandholz et al. ............ 361/695 |
| 2009/0027852 A1 | 1/2009 | Roesner et al. |
| 2009/0116190 A1 * | 5/2009 | Glover et al. ................ 361/695 |
| 2009/0251857 A1 * | 10/2009 | Legen et al. .................. 361/689 |
| 2010/0265653 A1 * | 10/2010 | Neumann ................ 361/679.47 |

* cited by examiner

AIRFLOW BARRIERS FOR EFFICIENT COOLING OF MEMORY MODULES

BACKGROUND

1. Field of the Invention

The present invention relates to cooling computer components, and more specifically to management of air flow through a chassis containing computer components.

2. Background of the Related Art

Computer information systems typically can support multiple memory modules on a shared bus. In an effort to share the thermal load across all of the memory modules in a computer system, advances have been made to distribute the accesses across these modules substantially evenly. A key benefit of evenly distributing accesses is that, even though the system power and total heat load increase when more memory modules are added, the thermal load on each individual memory module is reduced, such that adequate thermal control is maintained.

When each channel is populated with only one memory module (i.e., there is only one memory module per channel), the total system power and total thermal load on the system is lower than when each channel includes multiple memory modules. However, the thermal load is concentrated on the individual memory module within each channel because that memory module has no other memory module on the same channel with which to share the load.

In a given computer system, the amount of power used by each individual memory module was determined in configurations where one, two or three dual in-line memory modules (DIMMs) per channel were installed. For these configurations, power consumed by each individual DIMM was calculated to be 15.2 W (with only one DIMM installed per channel; 15.2 W total per channel), 10.5 W (per DIMM with two DIMMs installed per channel; 21.0 W total per channel) and 7.9 W (per DIMM with three DIMMs installed per channel; 23.7 W total per channel). This shows that a single DIMM operating alone on a channel will experience a thermal load (i.e., 15.2 W) that is 92% greater than the thermal load experienced by the same DIMM when there are three DIMMs per channel (i.e., 7.9 W).

Further complicating efforts to cool the DIMM, many systems require that other components in other airflow paths must maintain a minimum level of airflow sufficient to cool its components when all of the DIMMs are populated. As a result, a dummy module is installed whenever a DIMM is removed in order to make sure that the alternate airflow paths for those other components are maintained. The presence of the dummy module prevents an increase in airflow through the DIMM, which maintains the airflow to the other components. Unfortunately, existing dummy modules do not provide additional airflow to DIMMs in a single DIMM per channel configuration despite the increased thermal load on the individual DIMMs in this configuration.

BRIEF SUMMARY

One embodiment of the present invention provides a computer system, comprising a chassis defining an air flow pathway from an upstream air inlet to a downstream air outlet, one or more fans for forcing airflow through the chassis from the upstream air inlet to the downstream air outlet, and first and second pluralities of memory module sockets disposed within the chassis in the airflow pathway. The first plurality of memory module sockets is arranged in a first column and the second plurality of memory module sockets is arranged in a second column that is downstream of the first column. A first memory module is operably received in a socket of the first column and a second memory module is operably received in a socket of the second column. The system further includes a plurality of airflow barriers including first and second pairs of adjacent airflow barriers, wherein the first pair of adjacent airflow barriers form an airflow channel guiding airflow along the first memory module and beyond the second column, and wherein the second pair of adjacent airflow barriers form an airflow channel guiding airflow through the first column and along the second memory module.

Another embodiment of the invention provides a system for controlling airflow to memory modules that are installed in first and second adjacent columns of memory module sockets. The system comprises a plurality of reconfigurable airflow barriers, wherein an adjacent pair of the reconfigurable airflow barriers forms an airflow channel providing airflow to a single memory module. Each of the airflow barriers comprises a first generally planar airflow guide selectively securable in a memory module socket of the first column, and a second generally planar airflow guide selectively securable in a memory module socket of the second column, wherein the second airflow guide includes a transitional member that is selectively extendable from the second airflow guide toward the first guide and selectively securable to the first guide in an extended condition.

A further embodiment of the invention provides a method comprising providing airflow through a chassis including an upstream column of memory modules and a downstream column of memory modules, dividing the airflow into first and second separate airflow streams extending from an upstream end of the upstream column to a downstream end of the downstream column, guiding the first airflow stream into contact with a single memory module operably-installed in the upstream column and to avoid contact with any memory module in the downstream column, and guiding the second airflow stream to avoid contact with any memory module in the upstream column and into contact with a single memory module operably-installed in the downstream column.

DETAILED DESCRIPTION

Embodiments of the invention provide airflow barriers that form an airflow channel to direct airflow between a pair of unoccupied memory module sockets in an upstream column of memory module sockets (in terms of airflow direction) to a memory module that is operably installed in a downstream column of sockets. The airflow barriers may also form an airflow channel to direct airflow that passes a memory module operably installed in the upstream column of memory module sockets so that the warmed air passes between a pair of unoccupied sockets in the downstream column. Accordingly, these embodiments provide more airflow and cooler airflow for both the upstream memory module and the downstream memory module, while also helping to maintain a balanced airflow across other components in the chassis. It should be recognized that the greater cooling of individual memory modules that is offered by embodiments of the invention enables the extended use of a single memory module per channel, even though the thermal load on such a memory module is greater. The result is an overall savings of power, since cooling requirements no longer dictate the installation of additional memory modules per channel in order to share and distribute the thermal load.

Figure 1:
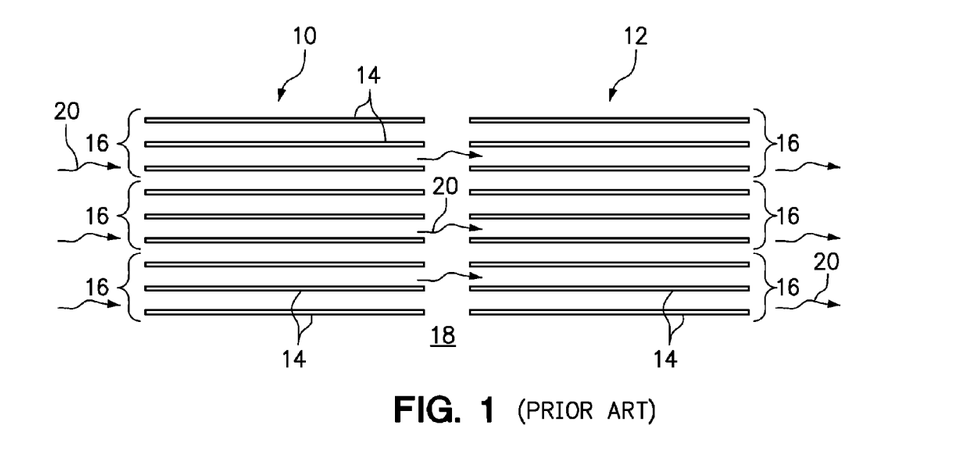
FIG. 1 is a plan view of first and second columns of memory module sockets.

FIG. 1 is a plan view of a prior art system including a first column 10 and a second column 12 of memory module sockets 14. This figure shows a typical server configuration having nine (9) memory module sockets 14 located in the first column 10 and an additional nine (9) memory module sockets 14 located in the adjacent second column 12. The sockets in each column 10, 12 are functionally configured as three (3) channels 16, with three (3) sockets shared per channel. The three shared memory module sockets of a particular channel 16 are adjacent and parallel to each other within the same column.

The columns of memory module sockets are typically installed on a printed circuit card 18, such as a motherboard, that is secured within a chassis (not shown). The chassis will typically either include a fan assembly or the chassis will be positioned relative to a fan assembly or computer room air conditioning (CRAC) system so that air is drawn through the chassis to cool internal components, such as memory modules operating within the two columns 10, 12 of memory module sockets. Regardless of the particular means for imparting airflow through the chassis, the chassis generally includes an inlet and an outlet that defines a direction or pathway of the airflow through the chassis. The memory module sockets 14, and therefore the memory modules themselves, are oriented generally parallel to the direction of airflow (designated by arrows 20) so that the air flows between the modules, such as a dual in-line memory module (DIMM), to cooling individual integrated circuits, such as dynamic random access memory (DRAM) chips. The direction of airflow 20 establishes a reference for describing the first column 10 as being "upstream" of the second column 12 or, conversely, the second column as being "downstream" of the first column. The distinction between upstream and downstream positioning of a component is significant in the context of the memory modules, because air flowing into the chassis is generally cool and picks up heat as the air passes through the memory modules. Accordingly, the air flowing to the downstream column of memory modules is typically warmer than the inlet air to the chassis.

Figure 2:
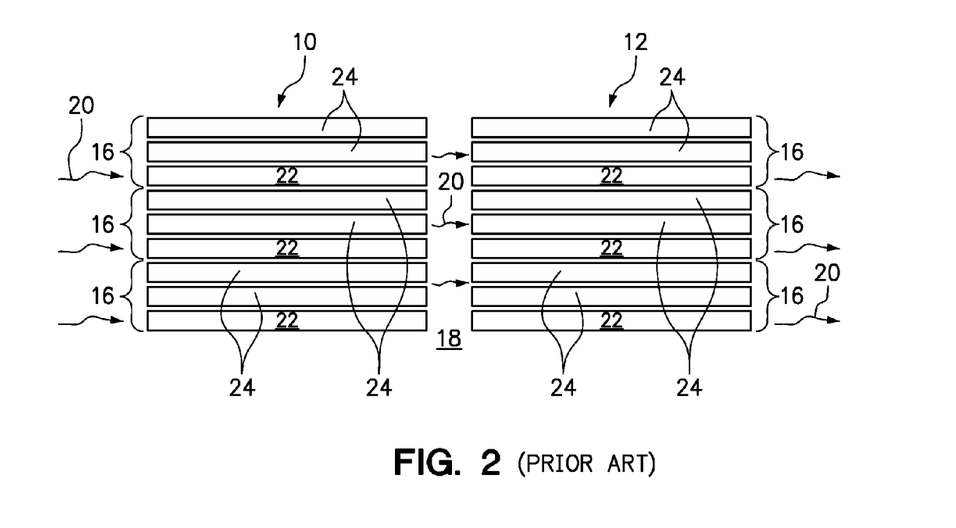
FIG. 2 is a plan view of the memory modules and dummy modules secured in the two columns of memory module sockets of FIG. 1.

FIG. 2 is a plan view of a prior art system including memory modules 22 and dummy modules 24 secured in the two columns 10, 12 of memory module sockets of FIG. 1. Although each of the sockets 14 of FIG. 1 could be filled with memory modules 22, this figure shows a single module 22 per channel 16. The other two sockets per channel 16 are each filled with a dummy module 24 that does not include any memory circuits, but has a similar form factor to a memory module 22. Accordingly, air flows through the narrow gaps between the modules 22, 24 and through the other portions of the chassis in the same manner as if all the sockets were populated with memory modules 22. Maintaining a balance of airflow between the memory modules and other components within the chassis is important to the proper cooling of all the components in the chassis.

Figure 3A:
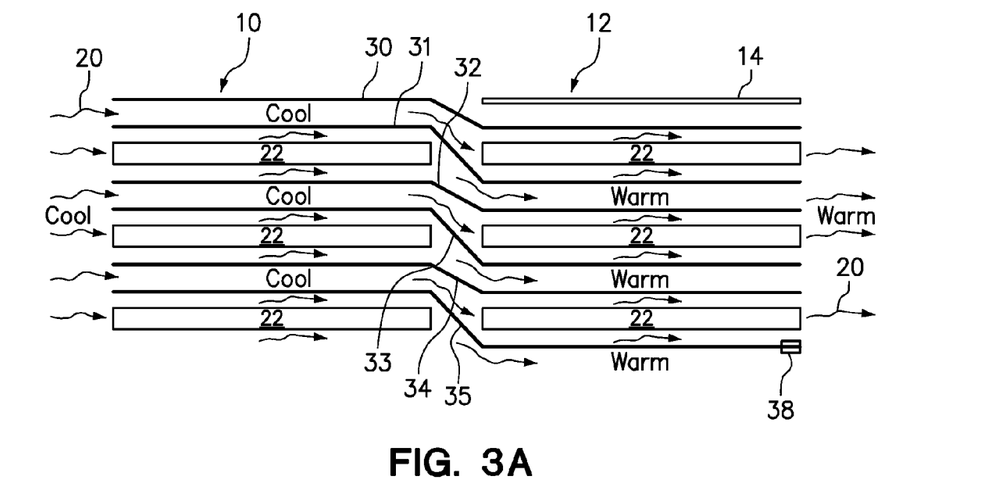
FIGS. 3A and 3B are plan views of a system that includes airflow barriers guiding airflow to one installed memory module per channel.

FIG. 3A is a plan view of a system that includes airflow barriers 30 guiding airflow to and from one installed memory module 22 per channel 16. Rather than using dummy modules to produce the same airflow patterns as if all socket were filled with memory modules (as in FIG. 2), air flow barriers 30-35 are implemented to actually improve the cooling of those memory modules 22 that are operably installed. Specifically, each of the memory modules 22 receives air that is cool (i.e., not preheated due to contact with an upstream component). The positioning of a pair of adjacent airflow barriers (such as barriers 31 and 32) form a channel that causes cool air to flow over the surfaces of memory modules 22 in the upstream column 10 and pick up heat that warms the air. The resulting warm air then continues to flow downstream between the same airflow barriers (31, 32) and through the second column 12 without contacting any other memory module. Another pair of adjacent airflow barriers (such as barriers 32 and 33) form another channel that causes cool air to flow downstream through the first column 10 without contacting or picking up heat from a memory module 22 and delivers the cool air to the memory module 22 in the downstream column 12. Using the airflow barriers 30-35 in a system with one installed memory module per channel provides each of the installed memory modules 22 with air that has not been preheated by an upstream component. Furthermore, each memory module 22 may even experience a greater quantity of airflow since the barriers 30-35 guide airflow where it is most needed. As a result of these improvements, the airflow barriers 30-35 allow greater use of a single memory module per channel configuration (which consumes less power than multiple modules per channel), since the additional thermal load on the individual memory modules is managed by the improved cooling.

Figure 3B:
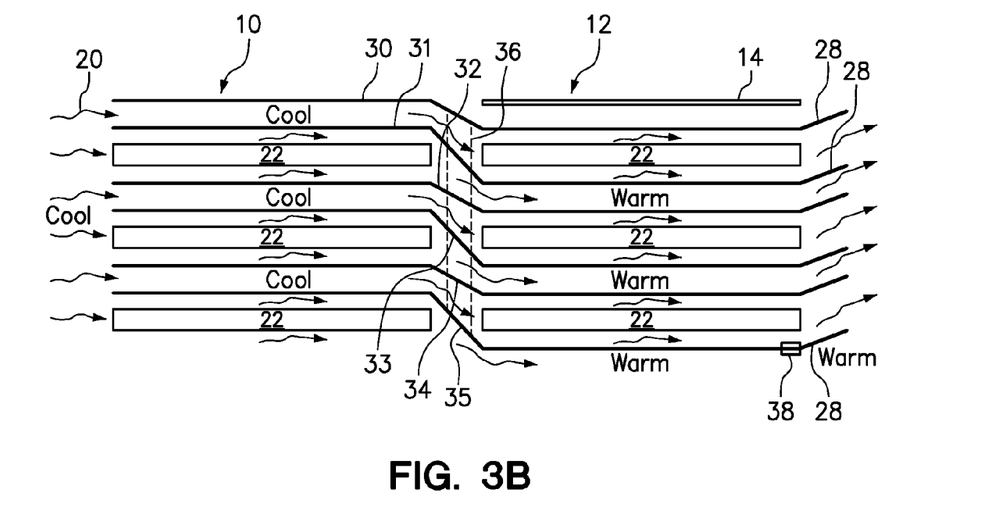

FIG. 3B is a plan view of the system of FIG. 3A, with the addition of a fin 28 extending at an angle from the downstream end of each airflow barrier 30-35. Depending on the type and location of components downstream from the memory modules 22, it might be beneficial or necessary to redirect the warm airflow in a particular direction. The fins 28 may be individually or collectively adjustable in order to direct the air in a desired direction.

FIGS. 3A and 3B also show that some of the airflow barriers (31, 33, 35) redirect airflow by two sockets or slots and other airflow barriers (30, 32, 34) redirect the airflow by one socket or slot. Either redirection will inherently increase the impedance of the airflow, but because there is substantial airflow available through the two empty sockets per channel, this impedance may be beneficial to maintaining balanced airflow across the chassis. Airflow analysis can be used to modify the shape of these airflow barriers to provide more airflow to the installed memory modules while maintaining the same level of airflow to other airflow components, as well as to determine the best shape of the transition between portions of the airflow barrier within the upstream column 10 and downstream column 12.

The airflow barriers 30-35 may be individually secured in position by extending into the empty sockets 14. Alternatively, the airflow barriers 30-35 may be secured together by a bracket 36 (shown in dashed lines) that extends to each of the barriers, such as in the transitional area between the first and second columns 10, 12. In embodiments where the airflow barriers are integrated, the entire assembly of barriers may be secured in one or more of the sockets.

To the bottom right of the downstream column 12, an optional small connector 38 is provided, which connector may be used to support and maintain proper position of the downstream end of the airflow barrier 35, where there is no memory module socket in the downstream column 12 within which to insert the barrier.

Figure 4A:
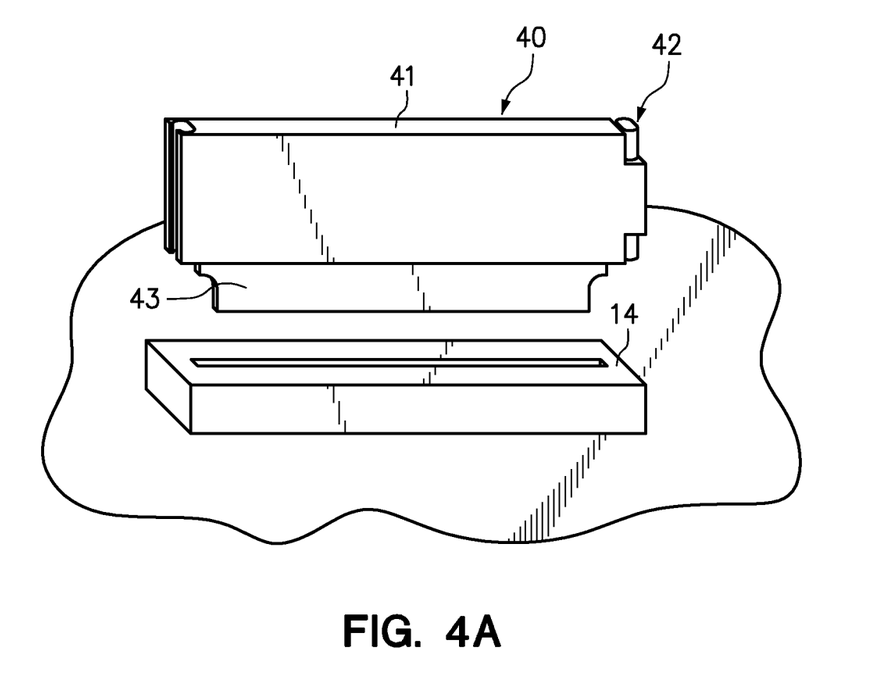
FIGS. 4A-4D are perspective views of an airflow guide that is securable in a memory module socket and has a slidably extendable transitional member.
Figure 4B:
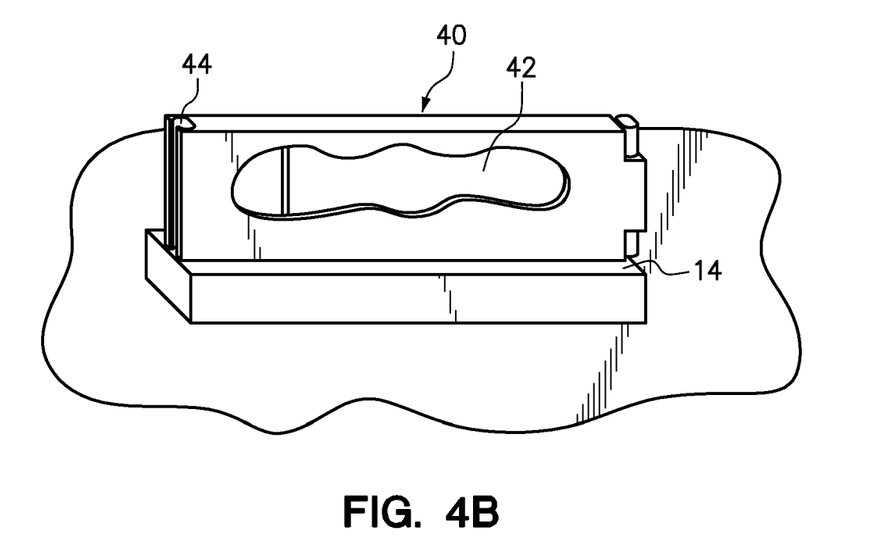
Figure 4C:
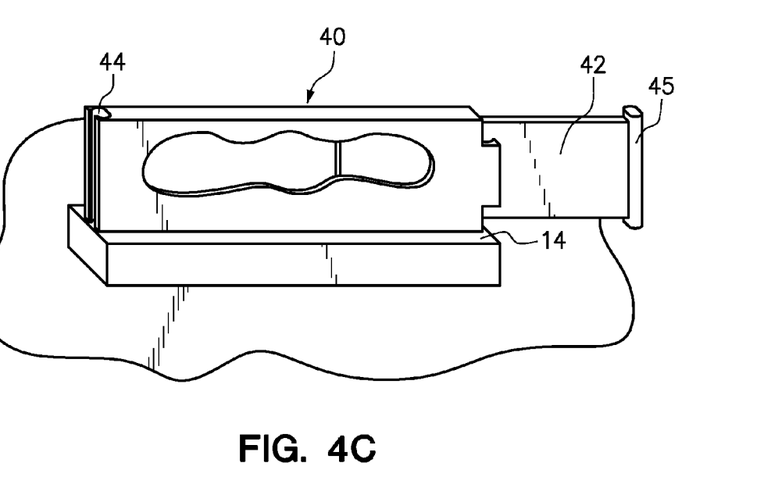

FIGS. 4A-4D are perspective views of an airflow guide 40 that is securable in a memory module socket 14 and has a slidably extendable transitional member 42. The airflow guide 40 has a hollow body 41 and a connector 43 along a lower edge. FIG. 4A shows a connector 43 aligned for insertion into the socket 14. The connector preferably has a form factor that is identical to that of a memory module that is intended for the socket 14, such as a DIMM, in order to be secured in the socket. FIG. 4B is a partial cross-sectional view of the airflow guide 40 after it has been secured in the socket 14. A cut-out portion in the side of the hollow body 41 reveals that the slidably extendable transitional member 42 is received inside the hollow body 41. A connector 44 is formed on the opposite end of the airflow guide 40 from where the transitional member 42 extends. As shown in FIG. 4B, the airflow guide 40 may serve as a dummy module, as in FIG. 2, without any further configuration. However, FIG. 4C shows that the slide-able and bendable transitional member 42 can be extended from the hollow body 41. The leading edge of the transitional member 42 preferably includes an element 45 that can be coupled to a connector, like connector 44, on an adjacent airflow barrier 40 (not shown).

Figure 4D:
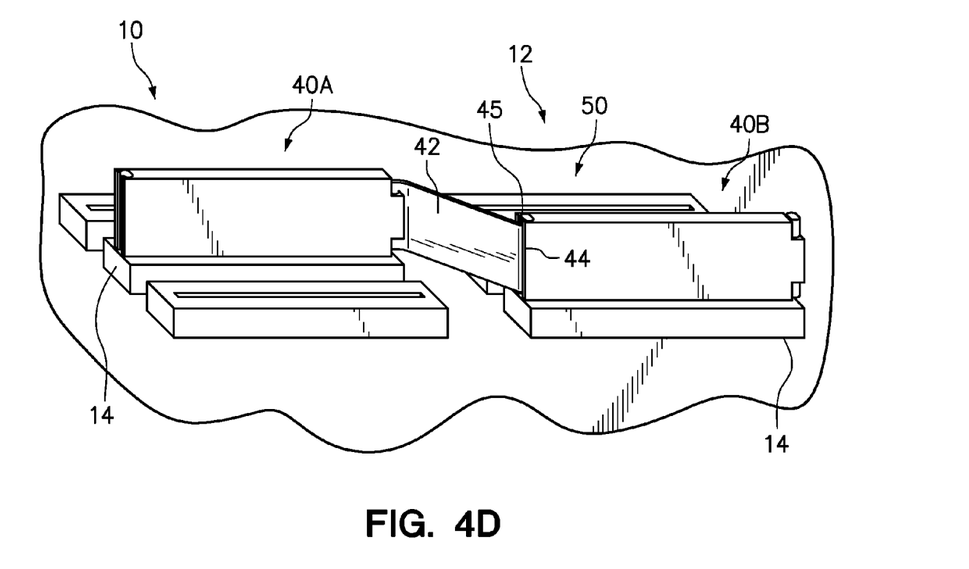

Two airflow guides 40 may be used together to configure an airflow barrier as shown in FIG. 4D. The airflow guide 40A is secured in a socket in the upstream column 10 and the airflow guide 40B is secured in a socket in the downstream column 12, but the two airflow guides are not in alignment (i.e., not in the same row). Therefore, the transitional member 42 has been extended from the first airflow guide 40A toward the second airflow guide 40B and the element 45 has been coupled to the connector 44 on the second airflow guide 40B. The combined structure of the first airflow guide 40A, the extended and coupled transitional member 42, and the second airflow guide 40B form an airflow barrier 50 that extends from the upstream edge of the sockets 14 in the upstream column 10 to the downstream edge of the sockets 14 in the downstream column 12. A pair of the airflow barriers 50 may be used to form an airflow channel for controlling the flow of air to a memory module, as shown in the following FIGS. 5A and 5B.

Figure 5A:
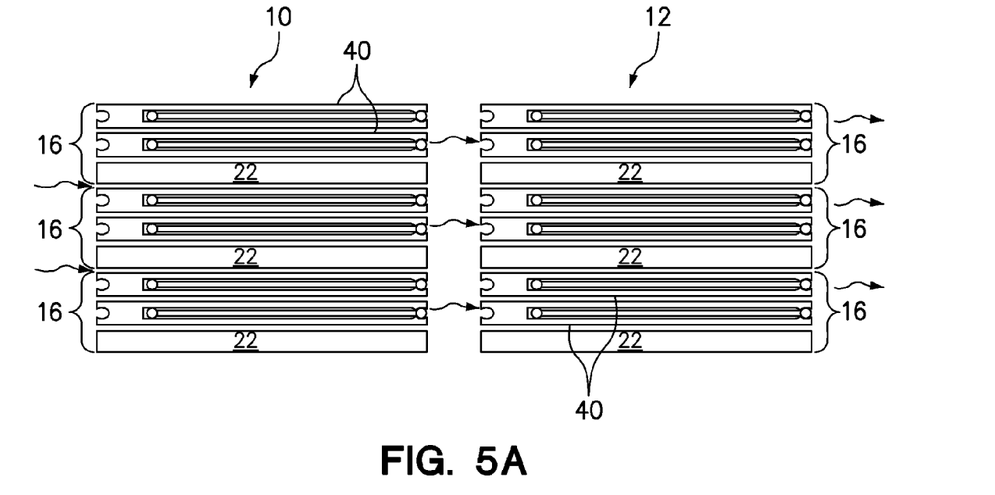
FIGS. 5A and 5B are plan views of a system that includes reconfigurable airflow barriers utilizing a plurality of airflow guides having slidably extendable transitional members according to FIGS. 4A-4D.
Figure 5B:
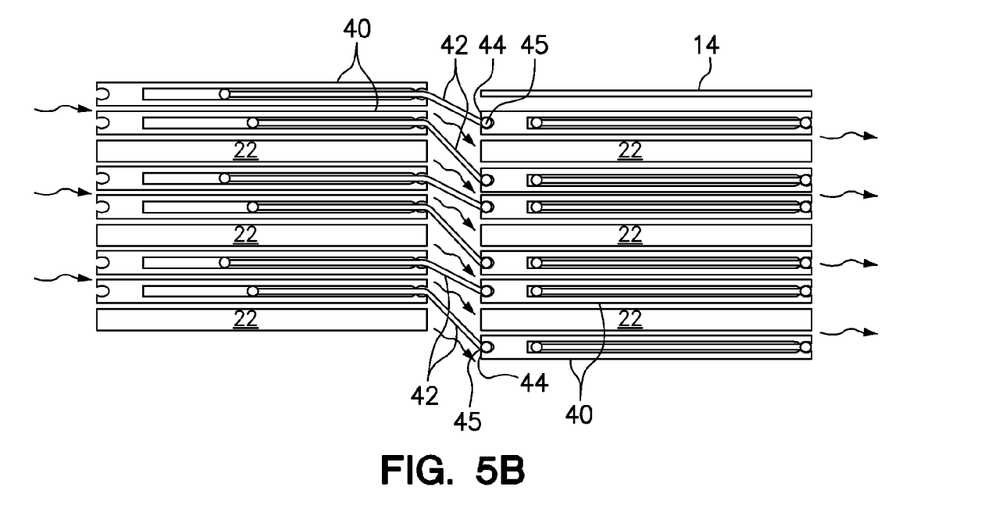

FIGS. 5A and 5B are plan views of a system that includes reconfigurable airflow barriers utilizing a plurality of airflow guides having slidably extendable transitional members according to FIG. 4. In FIG. 5A, the airflow guides 40 are configured as dummy modules disposed is the sockets that do not receive a memory module when there is only one memory module 22 per channel 16. Accordingly, the airflow guides 40 may be configured to perform as in the prior art system of FIG. 2. However, as shown in FIG. 5B, the airflow guides 40 may be configured to form airflow barriers, and a pair of adjacent airflow barriers may form an airflow channel containing a memory module 22 that functions to cool memory modules consistent with the description of FIG. 3A.

Figure 6A:
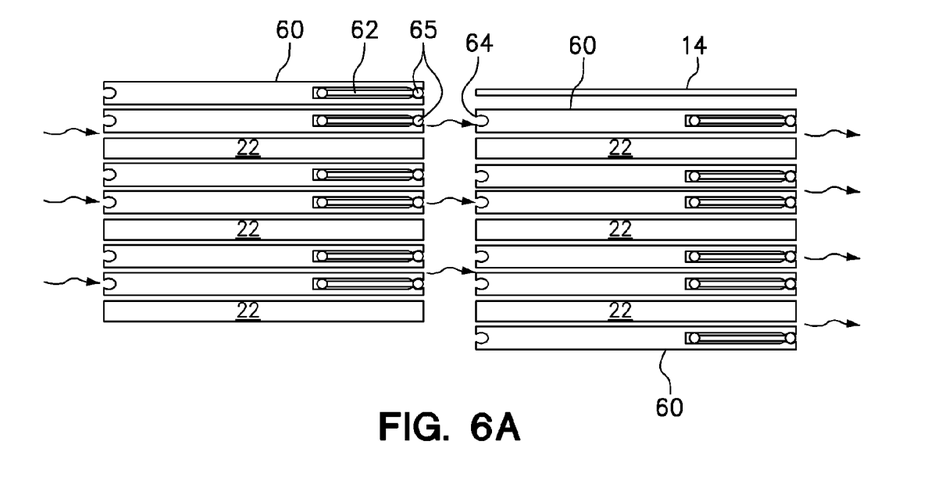
FIGS. 6A and 6B are plan views of a system that includes reconfigurable airflow barriers utilizing a plurality of airflow guides having stretchably extendable transitional members.
Figure 6B:
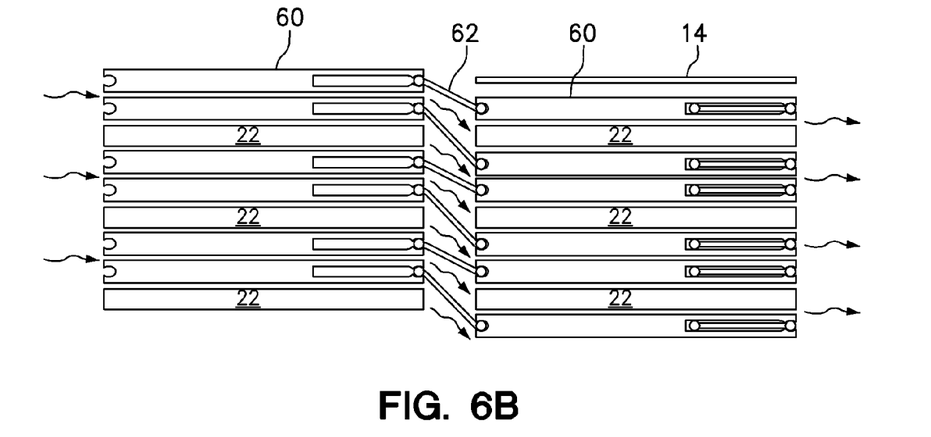

FIGS. 6A and 6B are plan views of a system that includes reconfigurable airflow barriers utilizing a plurality of airflow guides 60 having stretchably extendable transitional members 62. In FIG. 6A, the airflow guides 60 serve as a dummy module per FIG. 2. However, in FIG. 6B, the stretchably extendable transitional member 62 is used to form an airflow barrier in substantially the same manner as the slidably extendable transitional members 42 of FIGS. 4A-4D and 5A-5B, except that the member 62 may be shorter and made of a different material, such as a rubber or elastic. Otherwise, the transitional member 62 can still be extended so that the element 65 may be coupled to the connector 64 of another airflow guide 60 in the adjacent column.

The airflow barriers described herein may be used with any type of memory module, not just DIMMs, and may be used independent of connector form factors, including connectors of various lengths. The flexibility of securing the airflow guides and/or barriers in the sockets allows the user to configure the guides and/or barriers to form airflow channels that improve airflow to any particular installation of memory modules.

Figure 7:
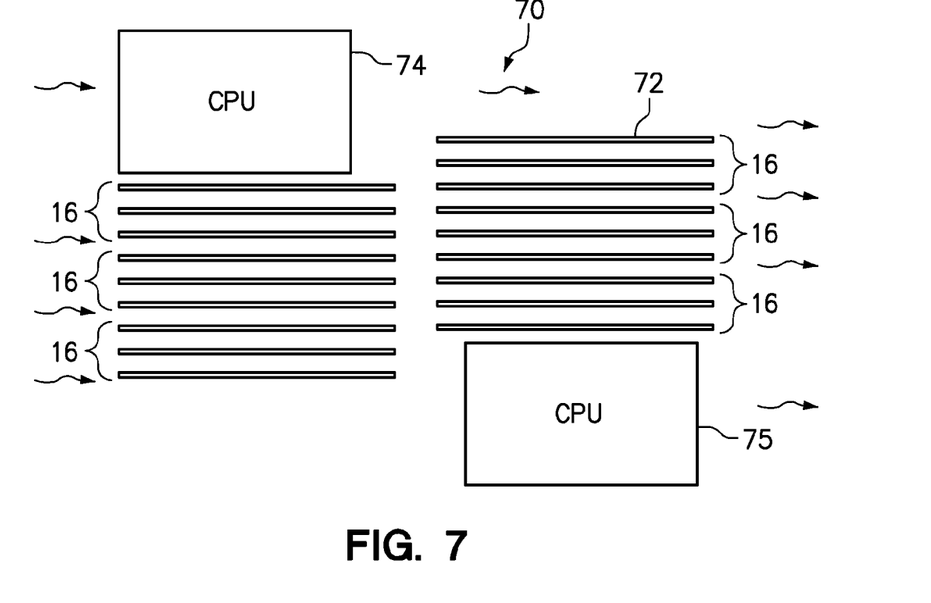
FIG. 7 is a plan view of a system having a memory module socket that is downstream of a CPU.

FIG. 7 is a plan view of a system having a memory module socket 72 that is downstream of a CPU 74. Specifically, the system 70 is a typical server configuration where 9 DIMMs are located in a first column below a first CPU 74, and an additional 9 DIMM are located in a second column above a second CPU 75. Each column has 3 channels 16, with 3 shared DIMMS per channel that are adjacent to each other in the same column. In the system configuration 70, it is challenging to cool a memory module in the socket 72 that is directly downstream of the CPU 74.

Figure 8:
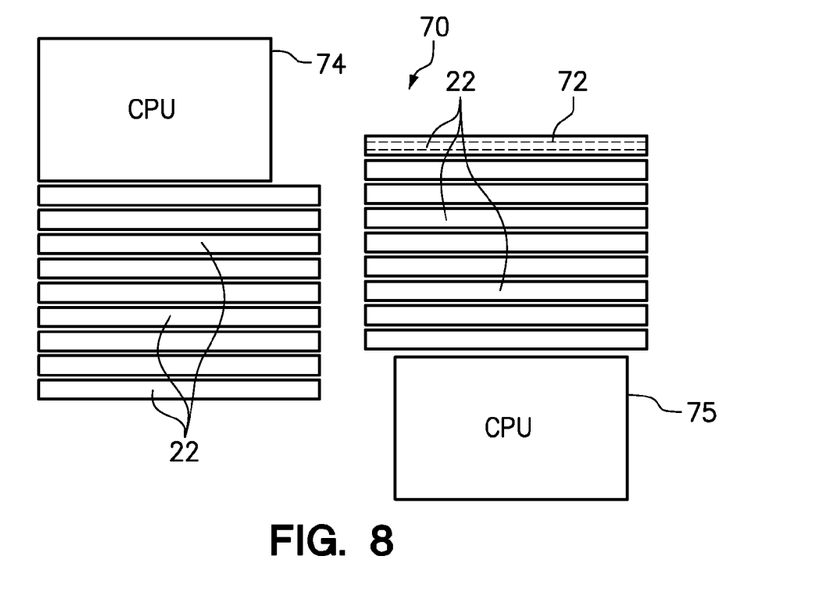
FIG. 8 is a plan view of the system of FIG. 7 with memory modules and dummy modules populating all the memory module sockets.

FIG. 8 is a plan view of the system 70 of FIG. 7 with memory modules 22 and dummy modules 76 populating all the memory module sockets. However, when the sockets are populated with only one memory module per channel (the worst case thermally for an individual DIMM), the use of dummy modules does nothing to help cool the module in the socket 72 downstream of the CPU 74.

Figure 9:
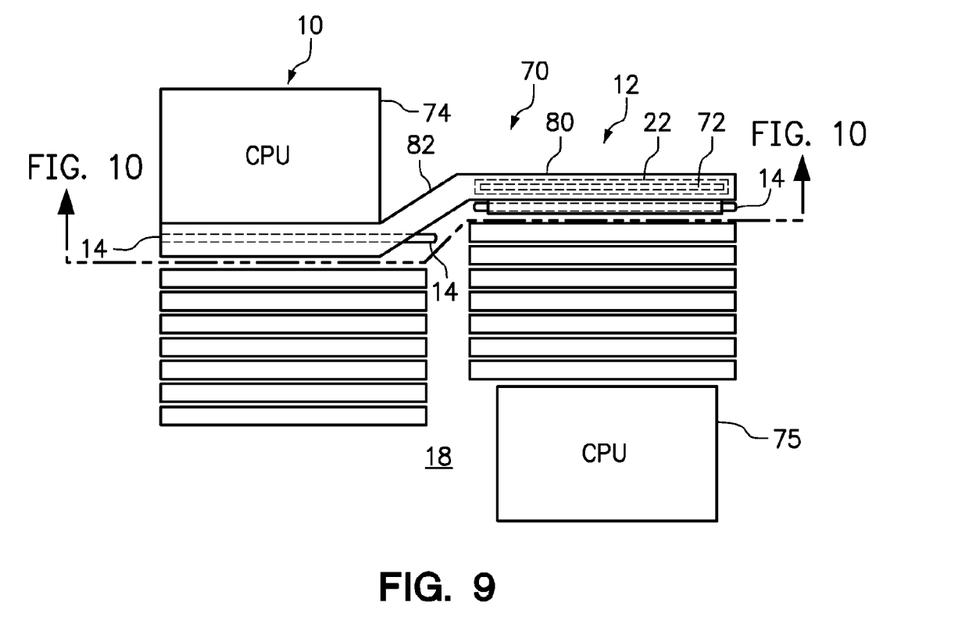
FIG. 9 is a plan view of the system of FIG. 8 where certain dummy modules have been replaced with an airflow channel directing airflow around and behind the CPU to a memory module installed in a socket downstream of the CPU.

FIG. 9 is a plan view of the system 70 of FIG. 8 where certain dummy modules have been replaced with an airflow channel 80 directing airflow around and behind the CPU 74 to the memory module 22 (shown in dashed lines) installed in the socket 72 (also shown in dashed lines) downstream of the CPU 74. The airflow channel 80 may optionally include connectors (such as connectors 43 of FIG. 4A) to be secured into one or two sockets 14 of column 10, into one or two sockets 14 in column 12 immediately adjacent the memory module 22, or both. The channel 72 extends along the side of the CPU 74 and crosses over behind the CPU to deliver fresh and non-preheated air to the memory module 22 positioned downstream of the CPU within the channel 80. The channel 72 can be wider at the front (upstream edge) than the prior art DIMM filler yet, at the system level, the channel can provide equivalent airflow impedance of two fillers. The channel 80 is preferably closed to enclose the airflow along the CPU in column 10 and through the transitional region 82. In the region of column 12 (i.e., the downstream portion securing the memory module 22), the channel 80 may either be closed over the top and sides to fit over the memory module 22 or it can have slits on the tope so that the channel occupies little or not height above the memory module (which might be helpful in close fitting enclosures).

Figure 10:
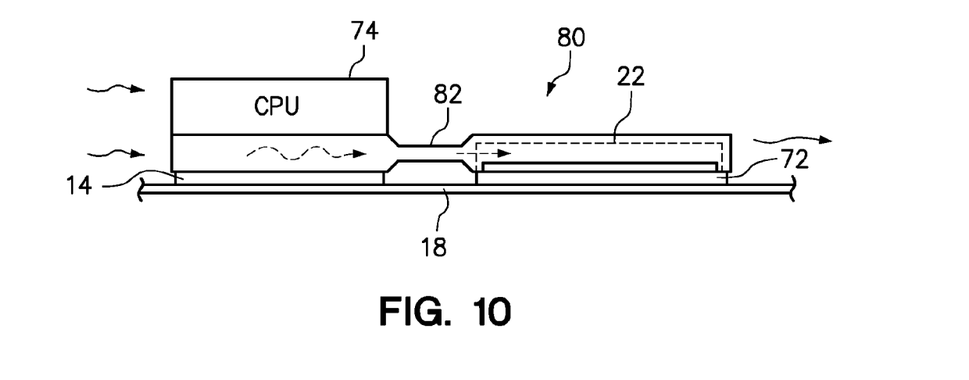
FIG. 10 includes plan and side views of the airflow channel of FIG. 9 for directing airflow behind a CPU.

FIG. 10 is a side view of the airflow channel 80 of FIG. 9 for directing airflow behind a CPU. The channel 80 includes a neck 82 in the transitional region between the first and second columns of memory module sockets 14 secured on the circuit board 18, where the channel crosses over behind the CPU 74. Airflow through the CPU that would have come into contact with the downstream DIMM will still flow downstream by passing above or below the narrow neck 82 and continuing downstream. Airflow from the CPU that is directed at an elevation below the top of the narrow neck 82 (i.e, between the top of the neck 82 and the circuit board 18) will flow either over or under the neck 82 (i.e., above or below the neck 82 as FIG. 10 is shown on the page). A balance can be achieved such that system level airflows are maintained, yet the air that is preheated by the CPU is prevented from contacting the downstream memory module. Furthermore, the memory module within the channel 80 receives fresh cooler air that entered the channel 80 at the upstream edge of the first column where the air is cool.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system, comprising:
a chassis defining an air flow pathway from an upstream air inlet to a downstream air outlet;
one or more fans for forcing airflow through the chassis from the upstream air inlet to the downstream air outlet;
first and second pluralities of memory module sockets disposed within the chassis in the airflow pathway, wherein the first plurality of memory module sockets is arranged in a first column and the second plurality of memory module sockets is arranged in a second column that is downstream of the first column;
a first memory module operably received in a socket of the first column and a second memory module operably received in a socket of the second column;
a plurality of airflow barriers including first and second pairs of adjacent airflow barriers, the first pair of adjacent airflow barriers forming an airflow channel guiding airflow along the first memory module and beyond the second column, and the second pair of adjacent airflow barriers forming an airflow channel guiding airflow through the first column and along the second memory module.

2. The system of claim 1, wherein the each of the plurality of airflow barriers comprises:
a first airflow guide selectively secured in a memory module socket of the first column;
a second airflow guide selectively secured in a memory module socket of the second column; and
a transitional member extending between the first and second airflow guides.

3. The system of claim 2, wherein the transitional member is selectively extendable from the second airflow guide toward the first guide and selectively securable to the first guide in an extended condition.

4. The system of claim 3, wherein the transitional member is slidably secured to the second airflow guide.

5. The system of claim 2, wherein the transitional member is selectively extendable from the first airflow guide toward the second guide and selectively securable to the second guide in an extended condition.

6. The system of claim 5, wherein the transitional member is slidably secured to the first airflow guide.

7. The system of claim 2, wherein the first airflow guide, the second airflow guide and the transitional member form an airflow barrier extending from an upstream edge of the first column to a downstream edge of the second column.

8. The system of claim 2, wherein the transitional member is flexible to extend between first and second airflow guides that are not aligned.

9. The system of claim 2, wherein the transitional member is stretchable to extend between the first and second airflow guides.

10. The system of claim 1, wherein the first and second columns of memory module sockets each include two or more channels on a memory bus and at least three sockets per channel.

11. The system of claim 2, wherein the second column includes at least one memory module socket that is downstream of a CPU and operably receives a memory module, wherein the transitional member extends downstream of the CPU to deter heated air from the CPU contacting the memory module.

12. The system of claim 11, wherein the transitional member is necked to allow heated air from the CPU to pass over or under the transitional guide.

13. A system for controlling airflow to memory modules that are installed in first and second adjacent columns of memory module sockets, the system comprising:
a plurality of reconfigurable airflow barriers, wherein an adjacent pair of the reconfigurable airflow barriers form an airflow channel providing airflow to a single memory module, each of the airflow barriers comprising:
a first generally planar airflow guide selectively securable in a memory module socket of the first column; and
a second generally planar airflow guide selectively securable in a memory module socket of the second column, wherein the second airflow guide includes a transitional member that is selectively extendable from the second airflow guide toward the first guide and selectively securable to the first guide in an extended condition.

14. The system of claim 13, wherein the first column is upstream of the second column, and wherein each of the reconfigurable airflow barriers extends from an upstream edge of the first column to a downstream edge of the second column.

15. The system of claim 13, wherein the first column is downstream of the second column, and wherein each of the reconfigurable airflow barriers extends from an upstream edge of the second column to a downstream edge of the first column.

16. The system of claim 13, wherein the transitional member is slidably extendable from the second airflow guide.

17. The system of claim 16, wherein the transitional airflow guide is bendable.

18. The system of claim 13, wherein each of the first airflow guides includes a connector for coupling with the transitional member.

19. The system of claim 13, wherein the transitional member is stretchable between the first and second airflow guides.

20. A method comprising:
providing airflow through a chassis including an upstream column of memory modules and a downstream column of memory modules;
dividing the airflow into first and second separate airflow streams extending from an upstream end of the upstream column to a downstream end of the downstream column;
guiding the first airflow stream into contact with a single memory module operably-installed in the upstream column and to avoid contact with any memory module in the downstream column; and
guiding the second airflow stream to avoid contact with any memory module in the upstream column and into contact with a single memory module operably-installed in the downstream column.

21. The method of claim 20, wherein the single memory module operably-installed in the upstream column is aligned with the single memory module operably-installed in the downstream column.

* * * * *